Oct. 9, 1923.  1,470,040
L. S. WHITEHEAD
ATTACHABLE GRIP HANDLE
Filed Aug. 21, 1922
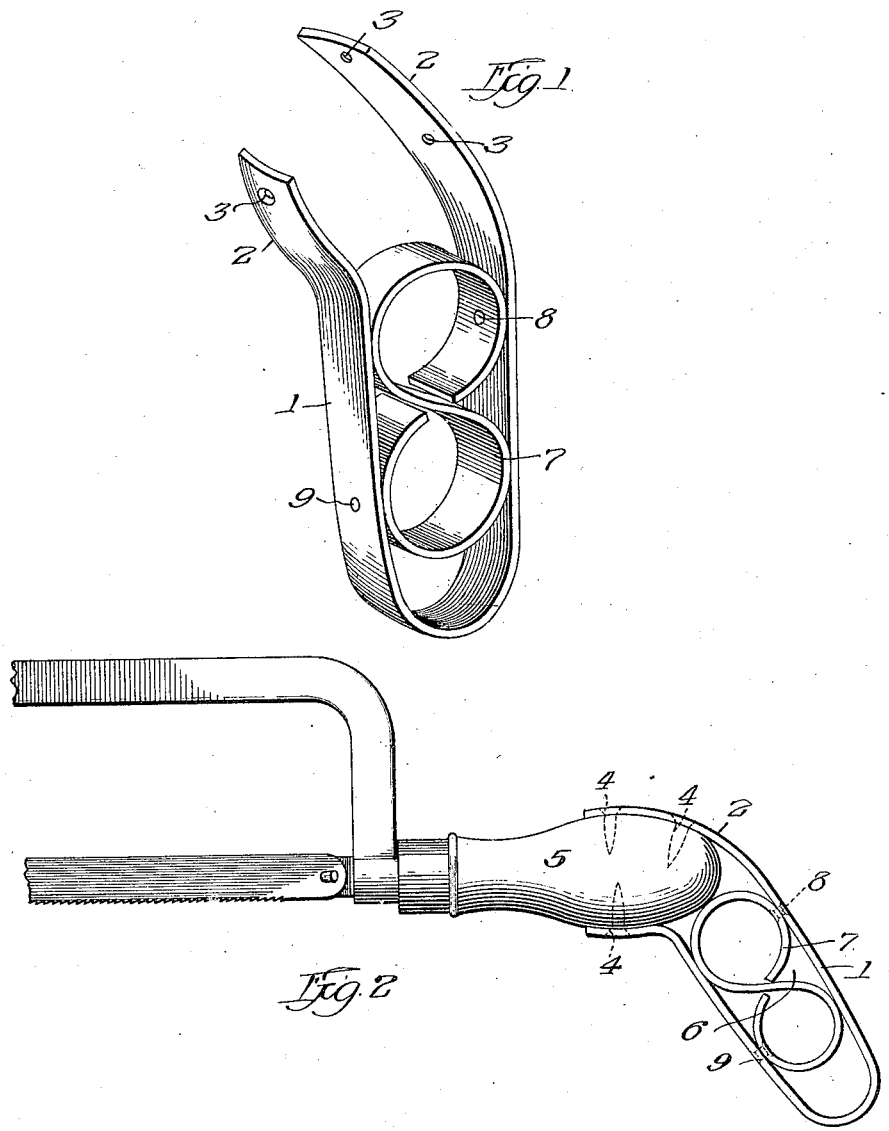
Witness:
Inventor:
Leo S. Whitehead Patented Oct. 9, 1923.

1,470,040

UNITED STATES PATENT OFFICE.

LEO S. WHITEHEAD, OF AKRON, OHIO.

ATTACHABLE GRIP HANDLE.

Application filed August 21, 1922. Serial No. 583,162.

*To all whom it may concern:*

Be it known that I, LEO S. WHITEHEAD, a citizen of the United States, and a resident of Akron, Summit County, Ohio, have invented certain new and useful Improvements in Attachable Grip Handles, of which the following is a specification.

This invention relates to an attachment for tool handles.

The grip for tools of all sorts, known as the "pistol grip," has of recent years become very popular in mechanics' tools of all kinds, owing to its superiority over the old style of straight handle, and tools equipped with pistol grip handles command a better price than tools equipped with other forms of handles.

It is the purpose of this invention to provide an attachable handle member which can be manufactured at a low cost and which is adapted to be attached to different sized tool handles to convert them from the straight handle to the superior pistol grip handle. As such, it is possible to purchase the same tool with the less expensive grip and convert it to the higher priced grip and to change over old tools.

In the drawings accompanying this application is shown one form of the detachable and attachable grip handle, it peing understood that the form of the invention is not essential and may be varied as desired. I believe that I am the first to design a tool handle for this purpose and as such I am entitled to a range of equivalents to cover the substance of the invention.

In the drawings:

Figure 1 is a perspective view of the attachable grip handle; and

Figure 2 is a side view showing the manner in which it may be attached to a hacksaw, or any other tool.

In the embodiment of the invention which is shown herein, the tool is formed of a strip of spring metal 1 which is in substantial U-shape, the end 2 of the strip, or strap, being curved slightly to form the outline of the usual bulbed straight handle such as found in commercial forms of screw-drivers, hack-saws, or the like. The strips are provided at this point with a suitable number of holes 3 for the reception of the screws 4 which pass into the tool handle 5. In Figure 2 the tool is illustrated as a usual form of hack-saw.

The ends 2 form a tool handle engaging portion of the grip while the body forms a grip portion 6 which is shaped as the ordinary pistol grip and is arranged at the proper angle to the handle engaging portion of the attachment.

Between the arms of the strap 1 is located a filler member or brace 7, which, in the present instance, is shown as a strap bent into the form of a figure 8. The filler member is attached to the handle by two rivets 8 and 9 arranged preferably as shown on opposite sides of the handle and attached to the inner and outer halves of the filler member respectively. By attaching the strap to the brace by the rivet 9 placed remote from the end 2, one of the arms of the handle may be spread to enable different sized handles to be accommodated between the ends 2.

It will be seen that the objects stated have been accomplished in a form of attachable handle which can be made at little expense and is easily attachable to straight handle tools. The form of the invention shown is not controlling, as I believe that I am the first to realize the possibilities of affording an easy and inexpensive means for converting straight handle grip tools into pistol grip tools and of supplying a means to carry this into effect.

What I claim is:

1. An attachment adapted to be received over and attached to a bulbed tool handle comprising a strap of metal bent at approximately its central point providing two substantially parallel arms which are curved at their outer ends in a direction at an angle to the remainder of the handle and of such formation as to be received over the tool handle and adapted to be secured thereto, whereby a straight handled tool may be converted to a tool having a pistol grip.

2. An attachment for tool handles, comprising a separable grip handle having a recessed portion shaped to surround a bulbed tool handle and an angular portion integral therewith and shaped to fit within a palm to afford a pistol grip.

3. An attachment for tool handles, comprising a strap of metal bent in general U-shape, the ends of the strap being open to receive a tool handle, the body of the strap forming a grip arranged angularly with respect to the ends of the strap.

4. An attachment for tool handles, comprising a strap of metal bent in general U-shape, the ends of the strap being curved and open to fit over a bulbed tool handle, the body of the strap forming a grip arranged angularly with respect to the ends of the strap.

5. An attachment for tool handles, comprising a strap of metal bent in general U-shape, the ends of the strap being curved and open to fit over a bulbed tool handle, the body of the strap forming a grip arranged angularly with respect to the ends of the strap, and a brace within the body of the strap.

6. An attachment for tool handles, comprising a strap of spring metal bent in general U-shape, the ends of the strap being open to receive a tool handle, the body of the strap forming a grip arranged angularly with respect to the ends of the strap, and a brace within the strap connected to the two sides thereof, the point of connection of one side being remote from one end of the strap to allow the ends of the strap to be spread.

LEO S. WHITEHEAD